US005376776A

United States Patent [19]

Paese et al.

[11] Patent Number: 5,376,776

[45] Date of Patent: Dec. 27, 1994

[54] NUMBER WHEEL STACK ASSEMBLY FOR UTILITY METERS

[75] Inventors: Andrew J. Paese, Brown Deer; Mark D. Slaugenhoup, Kewaskum, both of Wis.

[73] Assignee: Badger Meter, Inc., Milwaukee, Wis.

[21] Appl. No.: 218,491

[22] Filed: Mar. 25, 1994

[51] Int. Cl.[5] ........................ G01C 22/00; G06C 27/00

[52] U.S. Cl. .................................... 235/95 R; 235/96; 235/117 R; 235/139 A

[58] Field of Search .................... 235/95 R, 96, 117 R, 235/133 R, 139 A, 139 R

[56] References Cited

U.S. PATENT DOCUMENTS 1,692,489 11/1928 Dinsmore ........................ 235/139 A
3,137,444 6/1964 HArada .......................... 235/117 R
3,147,918 9/1964 Vroom ............................ 235/117 R
3,216,658 11/1965 Greenhow ........................ 235/91 R
3,262,641 7/1966 Hermann et al. .................. 235/143
3,432,096 3/1969 Powell .................................. 235/96
3,945,563 3/1976 Inoue ..................................... 235/96
3,965,847 6/1976 Deming ............................ 235/95 R
4,012,623 3/1977 Fleischer ............................... 377/89
4,015,109 3/1977 Deming ................................ 235/96
4,267,438 5/1981 Regan .................................. 235/96
4,829,164 5/1989 Rudolph et al. ................ 235/139 R
4,841,130 6/1989 Maschino .............................. 235/96
4,889,976 12/1989 Powell .................................. 235/96
4,975,564 12/1990 Maschino .............................. 235/96
5,091,633 2/1992 Glover et al. .................... 235/95 R
5,162,637 11/1992 Ariki ............................... 235/133 R

*Primary Examiner*—Michael L. Gellner
*Assistant Examiner*—Eddie C. Lee
*Attorney, Agent, or Firm*—Quarles & Brady

[57] ABSTRACT

A number wheel assembly for a counter mechanism has a plurality of hubs with an eccentrically shaped aperture for slideable assembly and orientation on a shaft and eccentric lobe. Each hub having a recess and a pinion spindle in the recess for receiving an internal pinion gear having narrow teeth alternated with wider teeth that extend outside the hub. The number wheels, which represent successive orders of magnitude, are slipped over the hubs. Each number wheel has a single tooth that engages one of the wider teeth of the pinion gear driving the next higher order number wheel once for each revolution of the number wheel. This moves the pinion which, in turn, moves the next higher order number wheel. The gear ratio is 1:10 for a decimal counter. The lowest order number wheel is a drive wheel which includes means operable by a drive mechanism for advancement in increments of 1/10 revolution for each cycle of operation of the drive mechanism.

6 Claims, 2 Drawing Sheets

FIG. 4
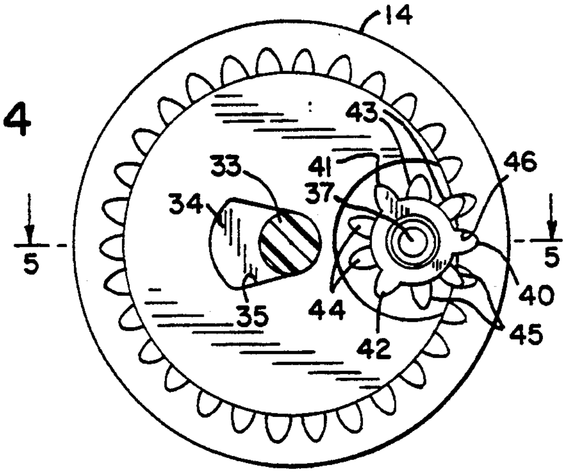
FIG. 5
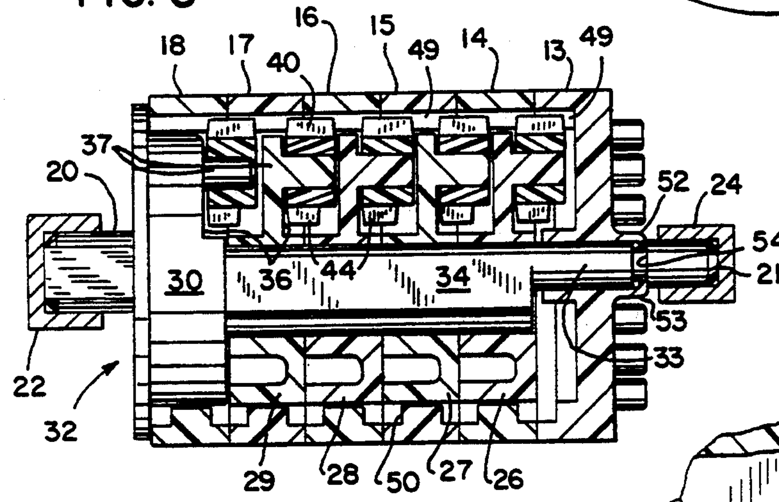
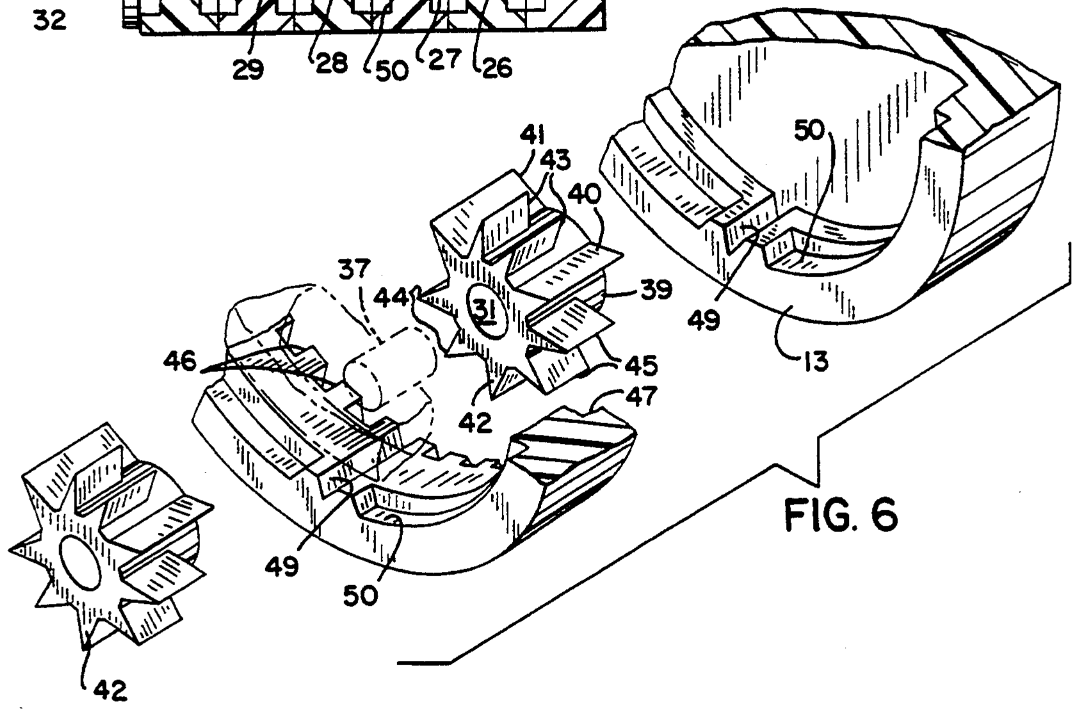
FIG. 6

NUMBER WHEEL STACK ASSEMBLY FOR UTILITY METERS

TECHNICAL FIELD

The invention relates to meter registers for counting units of consumption in utility meters.

BACKGROUND ART

Registers for utility meters have typically used some form of decade counting device for recording units of consumption.

Vroom, U.S. Pat. No. 3,147,918, shows a counter mechanism with an external pinion design including a plurality of number wheels and external pinion gears. The number wheels are held on a shaft by flexible tongues.

Greenhow, U.S. Pat. No. 3,216,658, shows another external pinion design and another construction for holding the number wheels on the shaft. The number wheels have enlarged slots of different area than the cross-section of the drive shaft. Pins are utilized to connect the shaft to the number wheels.

Hermann, et al., U.S. Pat. No. 3,262,641, shows a complex central hub with cams that contact projections on the inside of the number wheels.

Harada, U.S. Pat. No. 3,137,444, Maschino, U.S. Pat. No. 4,975,564, Maschino, U.S. Pat. No. 4,841,130 and Glover, et al., U.S. Pat. No. 5,091,633 show odometers with internal double pinion gears having portions on opposite sides of a pinion carrier plate connected by a rotating pinion shaft. Inoue, U.S. Pat. No. 3,945,563, shows an internal pinion with long teeth alternating with shorter teeth.

There is still a need in the technical art for counter mechanisms that can be manufactured at lower cost while providing suitable operating characteristics. This need is particularly felt in the utility meter field where there is both expansion of international markets and increasing competition among manufacturers located in various countries in the world.

SUMMARY OF THE INVENTION

The invention relates to an improved number wheel assembly for use in counter mechanisms such as that used in the register of a utility meter.

The assembly features a plurality of number wheel hubs with eccentrically shaped apertures for slideable assembly and orientation on a shaft and eccentric lobe. Internal pinion gears are mounted on short pinion spindles in recesses in the hubs with the number wheels rotating around the hubs as they are engaged and driven by the pinion gears. The lowest order number wheel is a drive wheel which includes means operable by a drive mechanism for advancement in incremental portions of a revolution for each cycle of operation of the drive mechanism. As each number wheel is driven around one revolution it carries a single tooth which engages the pinion mounted inside the next higher order number wheel. The engagment by the single tooth drives the pinion a distance which in turn drives the next number wheel 1/10 revolution.

The invention provides a number wheel stack assembly with an integrated carrier, including a one-piece shaft and lobe which cooperates with eccentric apertures in number wheel hubs to secure the hubs against rotation with fewer parts than seen in the prior art. This construction assists reduces parts and costs in manufacturing and assembly.

The individual mounting of the pinion gears in the hubs, as opposed to mounting on plates separating the number wheels is another difference from the prior art discussed above, which further reduces parts and costs in manufacturing and assembly.

The invention further provides for specialized constructions on each end of the assembly, with one of the ends being integrated with the carrier and with the other end being provided with a specialized drive number wheel.

The number wheel assembly of the present invention is particularly well suited for manufacture in plastic by injection molding.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

BRIEF DESCRIPTION OF THE DRAWINGS

FIG. 4 is a sectional view taken in the plane indicated by line 4—4 in FIG. 3; and FIG. 5 is a sectional view taken in the plane indicated by line 5—5 in FIG. 4; and FIG. 6 is a fragmentary exploded view of the assembly of FIG. 2.

DETAILED DESCRIPTION OF THE PREFERRED EMBODIMENT

Figure 1:
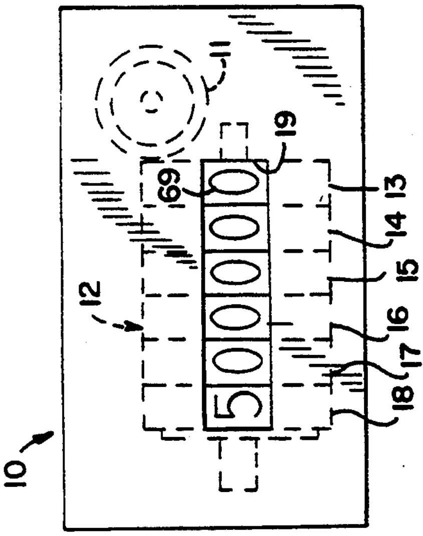
FIG. 1 is a front view of a portion of a meter register incorporating a number wheel assembly of the present invention.

FIG. 1 shows a portion of meter register 10 of the type used in utility meters to record consumption of units of gas, electricity and water. Not shown in a main portion of the meter in which a mechanical prime mover, a water turbine, for example, is moved by the flow of fluid. This mechanical prime mover is coupled to the present meter register through a gear drive 11, seen in phantom in FIG. 1, which drives an assembly 12 of the present invention having six number wheels 13, 14, 15, 16, 17 and 18.

The meter register 10 may also include a type of electronic pulse transmitter (not shown) for converting the movements of the numbers wheels 13–18 into electrical signals for electrical signaling of utility consumption data.

The meter register 10 has a face with a window 19 for viewing the portions of the number wheels 13–18 representing the count at any given time. In this preferred embodiment, the counter is a decade counter. Each number wheel moves ten times to complete one full revolution and cause a next higher order number wheel to move 1/10 revolution. It should be apparent that although the preferred embodiment is a decade counter, other counters such as octal, could be constructed within the teaching of the invention.

Figure 2:
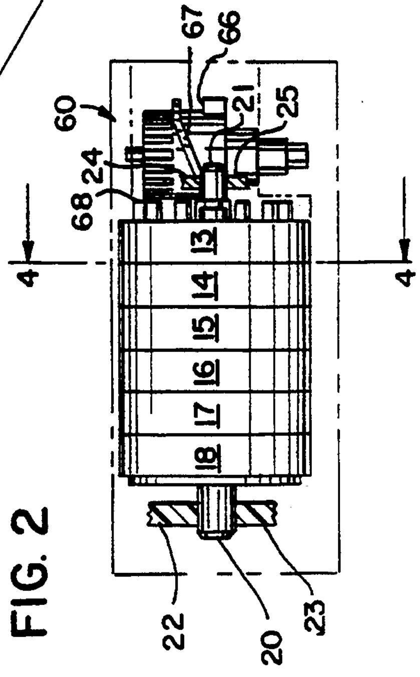
FIG. 2 is side view in elevation of a number wheel assembly in FIG. 1.

The number wheel assembly 12 has shaft ends 20, 21 (FIGS. 2 and 5) which are received in seats formed between pillars 22, 23 which trap and hold shaft end 20 and pillars 24, 25 which trap and hold shaft end 21. The pillars 22, 24 depend from a top cover member (not shown) disposed just under the face 19 and the bottom pillars 23, 25 rise from a bottom cover member (not shown). Shaft end 20 includes flatted sides to prevent the shaft 33 from rotating in its seat.

The number wheels 13–18 rotate around hubs 26–30, which remain stationary. The carrier 32 has a shaft 33 extending horizontally, and an eccentric lobe 34 which is integrally formed along a portion of the shaft 33 of sufficient length for mounting hubs 26–29. The hubs 26–29 each have an eccentric aperture 35, so that during assembly the hubs 26–29 fit in close, sliding relationship with the shaft-lobe combination 33–34 and are prevented from rotation due to the eccentric shape of the lobe 34 and apertures 35. Hub 30 is integrally formed with the carrier 32. The hubs 26–29 and carrier 32 can be formed of a polystyrene material, such Styron 498 from Dow Chemical, or other suitable materials used in the art.

The hubs 26–30 each have a hub body 26a and a pinion gear recess 36. The hubs 26–30 each form an integral spindle 37 in the recess 36 and an internal pinion gear 38 is rotatably mounted on each spindle 36. As seen best in FIG. 6, each pinion gear 38 has a gear hub 39 with an aperture 31 for receiving a pinion spindle 37. Each pinion gear 38 also has nine teeth integrally formed on the hub 39, including three wide male teeth 40–42 alternating with three pairs of narrow male teeth 43–45. The wide teeth 40–42 are engaged by a single female tooth 49 formed on the inner race 50 of each number wheel 13–18. The narrow male teeth 40–42 engage thirty female teeth 46 formed around one rim 47 of each of the number wheels 14–18 that is adjacent to its next lowest order number wheel 13–17.

Figure 3:
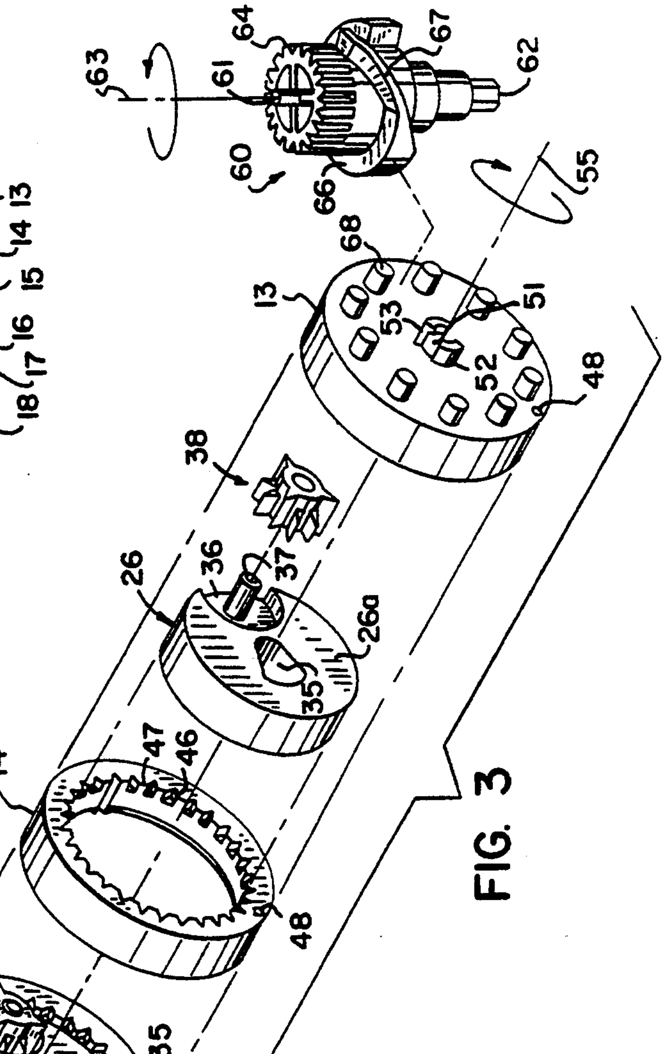
FIG. 3 is an exploded perspective view of the assembly of FIG. 2.
Figure 3:
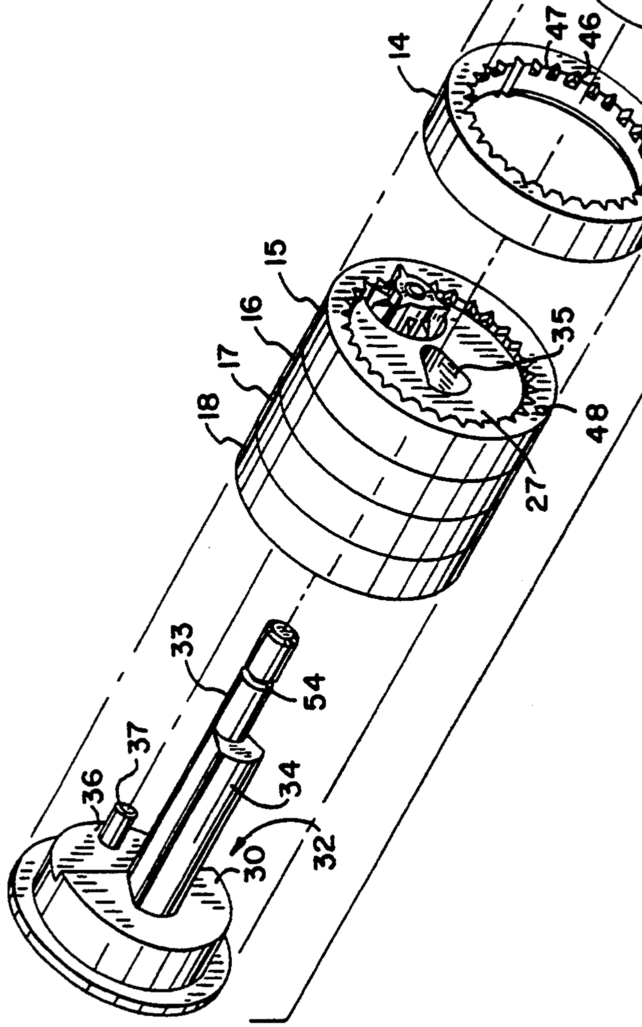

To assemble the assembly 12, as seen in FIG. 3, the first number wheel 18 is slid onto the integral hub 30. The pinion gear 38 is then mounted on post 37 with teeth 40–45 meshing with teeth 46 along the rim 47 of the number wheel 18. The parts are assembled, hub on carrier shaft 33, then wheel on hub, with each wheel 13–17 being rotated to a position in which an alignment hole 48 is positioned at approximately eight o'clock. Each pinion gear 38 is mounted on a pinion spindle 37, the pinion gear teeth 40–45 meshing with teeth 46 along the rim 47 of the number wheels 14–18. When a next hub and number wheel are added to the stacked assembly, a single tooth 49 inside that number wheel will fit over the ends of the wider teeth 40–42 on a pinion gear 38 for the next higher order number wheel 14–18, as seen best in FIG. 5. The pinion gear 38 and its wider teeth 40–42 extend beyond the number wheel 26–29 as it turns, while the hub body 26*a* is no wider than the number wheel 26–30 which fits over it.

Lastly, as seen in FIG. 5, the drive wheel 13 is added, with its single tooth 49 engaging the pinion gear 38 for the next higher order number wheel 14. The drive wheel 13 does not have the set of thirty teeth 46 seen on the other number wheels. The drive wheel 13, which is the lowest order wheel, includes a central aperture 51 seen in FIG. 3, and fingers 52, 53 extending along shaft 33, the fingers 52,53 having tips for snapping into a circumferential groove 54 in the carrier shaft 33, which is seen best in FIG. 5.

When assembled, the number wheels 13–18, but not the hubs 26–29, will rotate around central axis 55 in FIG. 3. Each time a number wheel 13–18 makes one revolution, its single tooth 49 formed across its inside race 50, will turn one of the three wide teeth 40–42 on a pinion gear 38 to move it ⅓ revolution. This, in turn will move the next highest order number wheel, the distance of three of its thirty teeth 46, or 1/10 revolution. Thus, the construction, in this example, provides a 1:10 gear ratio between each number wheel 13–17 and its next higher order number wheel 14–18, respectively.

The number wheel assembly 12 is driven through a lowest order drive wheel 13 by drive gear 60. Drive gear 60 includes shaft ends 61 and 62 by which gear 60 is mounted for rotation around axis 63. Gear teeth 64 form a drive train spur gear 65 which is driven in response to movement of the meter prime mover. Gear 60, which preferably made of a nylon material, has a ledge 66 formed by a part of a ring around its body, the ring terminating in a camming ramp 67. Round camming pins 68 project from drive wheel 13 and ride along ledge 66 as drive gear 60 is rotated, until engaged by ramp 67, which then lifts one of the pins 68 by an amount such that drive wheel 13 revolves 1/10 revolution for each revolution of drive gear 60. The rotation of the drive wheel 13 advances the register by one count, as a next number indicator 69 is moved into view in the window 13 seen in FIG. 1. The number indicia 69 are printed on the number wheels by a hot stamping technique of a type known in the art.

This has been a description of examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

I claim:

1. A counter assembly comprising:

a carrier having a shaft extending lengthwise to form an axis of rotation for a plurality of number wheels, the carrier also forming an eccentric lobe along one side of the shaft;

a plurality of number wheel hubs, each having an aperture of a shape that slideably receives the shaft and eccentric lobe to orient the hubs, while the eccentric lobe prevents said hubs from rotating around the shaft, each hub having a recess and a pinion spindle disposed in the recess, said pinion spindle being spaced radially from the shaft and extending substantially parallel to the shaft;

a plurality of internal pinion gears, each being disposed for rotation on a respective pinion spindle;

a plurality of number wheels representing successive orders of magnitude, each number wheel being rotatably disposed on a respective hub, each internal pinion gear having one or more wider teeth extending beyond the hub and alternating with one or more narrower teeth, and each number wheel having an inner race with a tooth that engages one of the wider teeth of the pinion gear mounted on the hub in a next higher order number wheel on each revolution of the tooth, each number wheel except a lowest order number wheel having a plurality of teeth disposed along a rim on one side of the inner race adjacent a next lower order number wheel, the plurality of teeth on the rim of the number wheel being driven by both the narrower and wider teeth on the driven pinion gear; and means operable for driving a lowest order number wheel in incremental portions of one revolution to drive the number wheel assembly through the pinion gears.

2. The number wheel assembly of claim 1, wherein each pinion spindle is formed as an integral portion of the respective hub.

3. The number wheel assembly of claim 1, wherein one of the hubs is formed as an integral part of the carrier, the integral hub having a recess, with a pinion spindle disposed in the recess and extending parallel to the shaft.

4. The number wheel assembly of claim 1, wherein each pinion gear provides three wide teeth alternated with three pairs of narrow teeth; and wherein each number wheel above the lowest order number wheel has a set of thirty teeth to be engaged by a respective pinion gear; and wherein an effective gear ratio of 1:10 is provided between each lower order number wheel and a next higher order number wheel.

5. The number wheel assembly of claim 1, wherein the lowest order number wheel has a central aperture;

wherein the shaft has an end extending through the central aperture with a circumferential groove on said extending end; and wherein the lowest order number wheel forms integral fingers extending along the extending end of the shaft, the fingers having tips that are received in the groove to secure the lowest order number wheel and the other number wheels on the shaft.

6. The number wheel assembly of claim 1, wherein the number wheels each have a small hole near an outer rim for aligning the number wheels in proper rotational position during assembly.

* * * * *

UNITED STATES PATENT AND TRADEMARK OFFICE
CERTIFICATE OF CORRECTION

PATENT NO. : 5,376,776

DATED : December 27, 1994

INVENTOR(S) : Paese, et al.

It is certified that error appears in the above-identified patent and that said Letters Patent is hereby corrected as shown below:

| | |
|---|---|
| Col. 2, line 1 | "assists" should be deleted. |
| Col. 2, line 31 | "is side" should be --is a side--. |
| Col. 2, line 46 | "in" should be --is--. |
| Col. 2, line 56 | "numbers" should be --number--. |
| Col. 4, line 18 | "preferably made" should be --preferably is made--. |

Signed and Sealed this

Eleventh Day of April, 1995

*Attest:*

BRUCE LEHMAN

*Attesting Officer*

*Commissioner of Patents and Trademarks*